United States Patent
Chung et al.

(10) Patent No.: US 7,225,039 B2
(45) Date of Patent: May 29, 2007

(54) CONTROL SYSTEM FOR SEMICONDUCTOR PROCESSING APPARATUS

(75) Inventors: Jae-Woo Chung, Seoul (KR); Jong-Hwan Weon, Suwon-si (KR); Hyo-Sang Jung, Seoul (KR); Myung-Kill Kim, Yongin-si (KR); Tae-Ha Jeon, Suwon-si (KR); Kyung-Bo Sim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/199,219

(22) Filed: Aug. 9, 2005

(65) Prior Publication Data

US 2006/0178768 A1    Aug. 10, 2006

(30) Foreign Application Priority Data

Feb. 4, 2005    (KR) ............... 10-2005-0010555

(51) Int. Cl.
*G06F 19/00*    (2006.01)
*G06F 11/30*    (2006.01)

(52) U.S. Cl. .............. 700/96; 700/9; 700/51; 700/103; 700/121; 702/182

(58) Field of Classification Search ............. 700/9, 700/51, 83, 95, 96, 103, 104, 108–110, 121; 702/179, 182, 183–184; 709/200, 203
See application file for complete search history.

(56) References Cited

U.S. PATENT DOCUMENTS 4,901,242 A * 2/1990 Kotan ............ 700/108
6,415,193 B1 * 7/2002 Betawar et al. ........ 700/97

FOREIGN PATENT DOCUMENTS

| JP | 2003-324043 | 11/2003 |
|---|---|---|
| KR | 1998-076614 | 11/1998 |
| KR | 2000-0028114 | 5/2000 |

* cited by examiner

*Primary Examiner*—Leo Picard
*Assistant Examiner*—Sean Shechtman
(74) *Attorney, Agent, or Firm*—Volentine & Whitt, PLLC (57) ABSTRACT

A control system for a semiconductor processing apparatus comprises a control server connected to a semiconductor processing apparatus, a verification server connected to the control server, and a database connected to the verification server. The verification server evaluates input parameter values stored in the semiconductor processing apparatus against verification data stored in the database. The results of the evaluation are used to determine whether a process will be performed by the semiconductor processing apparatus.

20 Claims, 5 Drawing Sheets

CONTROL SYSTEM FOR SEMICONDUCTOR PROCESSING APPARATUS

BACKGROUND OF THE INVENTION

1. Field of the Invention

The present invention relates generally to a control system for a semiconductor processing apparatus. More particularly, the invention relates to a control system for monitoring input parameter values supplied to the semiconductor processing apparatus.

A claim of priority is made to Korean Patent Application No. 2005-10555 filed on Feb. 4, 2005, the disclosure of which is hereby incorporated by reference in its entirety.

2. Description of the Related Art

Semiconductor devices are generally fabricated by a series of fabrication processes performed under highly specific conditions. The fabrication processes may include, for example, photographic and/or chemical processing steps used to create electrical circuits on a semiconductor wafer. The processing conditions may include, for example, timing information, chemicals, temperatures, and so forth, which are used for each processing step. Collectively, the series of processes and associated processing conditions used to form a semiconductor device may be referred to as a "recipe" for fabricating the device.

A recipe for fabricating a semiconductor device is generally stored in a semiconductor processing apparatus used to perform the fabrication processes. The recipe typically manifests itself as a set of input parameter values related to the processes and processing conditions and supplied to the semiconductor processing apparatus.

In order to ensure that the semiconductor device is fabricated correctly, the input parameter values are usually validated before and/or during the fabrication processes to ensure that they will lead to predictable and acceptable results. For example, the input parameter values may be validated by inspecting preset parameter values on the semiconductor processing apparatus prior to performing a fabrication process. In addition, the input parameter values may be validated by monitoring variations of the parameter values while the fabrication processes are being performed.

Figure 1:
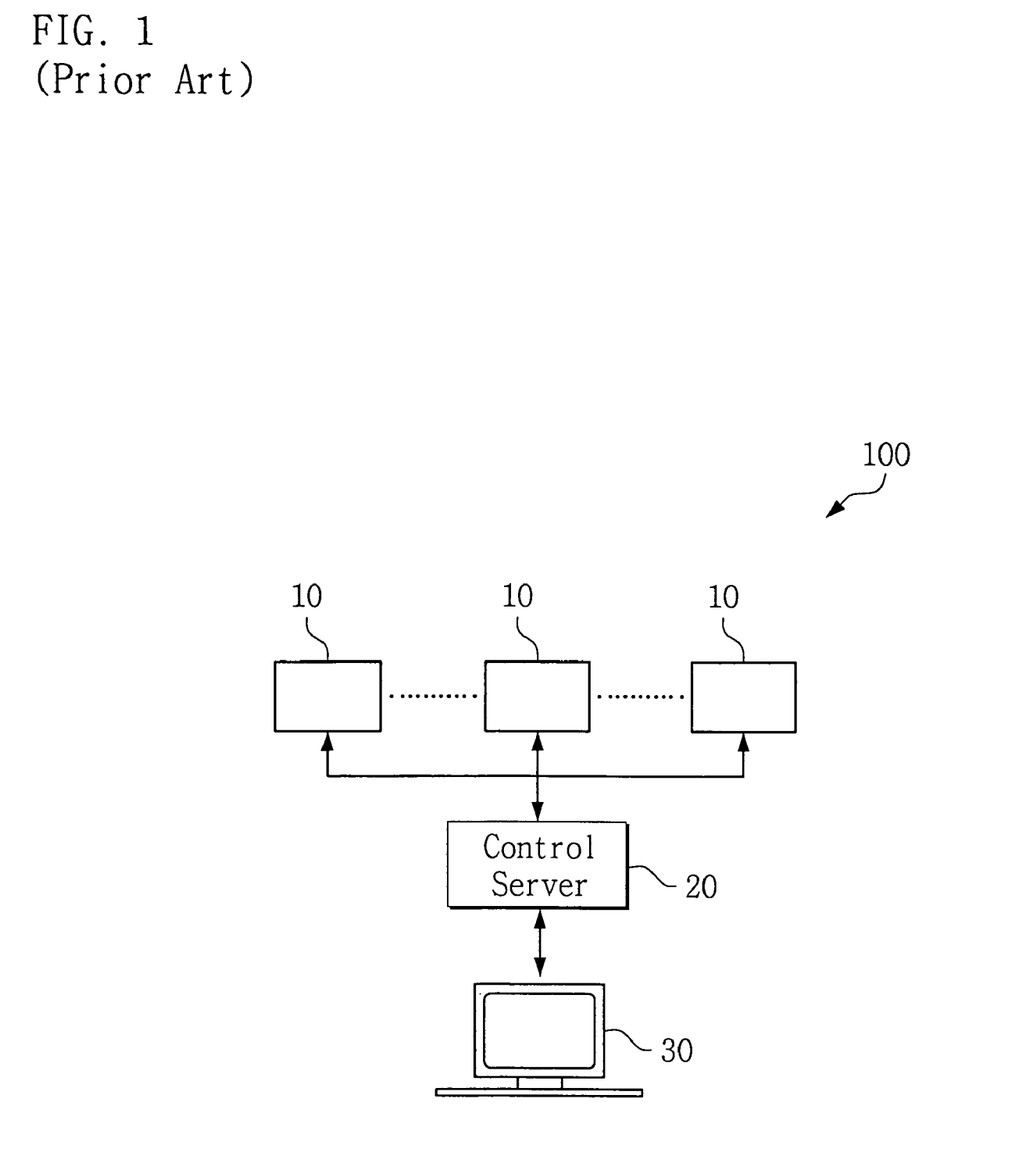
FIG. 1 is a block diagram of a conventional control system for a semiconductor processing apparatus.

FIG. 1 is a block diagram illustrating a conventional control system 100 for a semiconductor processing apparatus.

Referring to FIG. 1, conventional control system 100 comprises a control server 20 and an operator interface 30. A plurality of semiconductor processing apparatuses 10 arranged in fabrication lines are connected to control server 20 through a communication interface (e.g., a wired or wireless digital connection, network lines such as twisted pair cables, or the like). Operator interface 30 is also connected to control server 20 through a communication interface.

An operator uses operator interface 30 to perform a "track-in" operation. The term "track-in" refers to an operation whereby one of semiconductor processing apparatuses 10 is selected through operator interface 30. Typically the selection is made by a human operator. However, performing a track-in operation does not necessarily require a human operator. The track-in operation is performed by providing an input specifying a particular semiconductor processing apparatus 10 to control server 20 via operator interface 30.

Control server 20 runs a control program adapted to control semiconductor processing apparatuses 10. The control program includes a range specification for input parameter values supplied to semiconductor processing apparatuses 10. The range specification is used to determine whether the input parameter values supplied to semiconductor processing apparatuses 10 are proper. For example, the range specification may include upper and lower limits for each of the input parameters. Accordingly, input parameter values outside of the upper and lower limits are considered improper.

Figure 2:
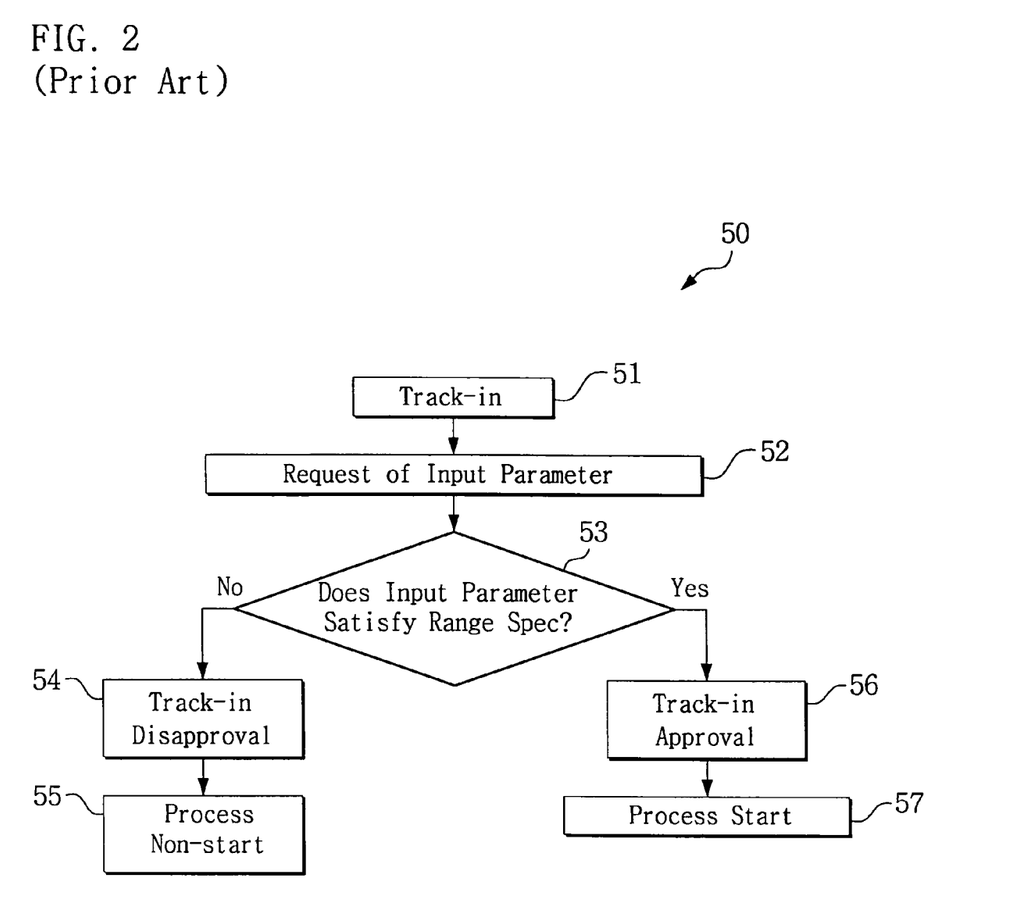
FIG. 2 is a flowchart illustrating a method of controlling a semiconductor processing apparatus using the control system shown in FIG. 1.

FIG. 2 is a flowchart illustrating a conventional method 50 of controlling a semiconductor processing apparatus using the control system shown in FIG. 1. Throughout this description, method steps are designated within parentheses (XXX) to distinguish them from system elements, like those shown in FIG. 1.

Referring to FIGS. 1 and 2, an operator sends a message specifying a specific semiconductor processing apparatus 10 to control server 20 through operator interface 30 (51). Control server 20 requests that the selected semiconductor processing apparatus 10 send a recipe including input parameter values (52) to control server 20. The recipe may include, for example, current preset parameter settings for the selected semiconductor processing apparatus 10.

Once the selected semiconductor processing apparatus 10 sends the recipe to control server 20, control server 20 uses the control program to determine whether or not the input parameter values in the recipe are proper according to the range specification (step 53). Based on a result of this determination, control server 20 determines whether or not to approve the track-in operation and whether or not to start fabrication processes specified by the recipe. Collectively, these determinations are referred to as an interlock decision step.

Where the input parameters are improper according to the range specification, control server 20 disapproves the track-in operation (step 54). In other words, the selection of the particular semiconductor processing apparatus 10 is cancelled. In addition, control server 20 also typically generates interlock signals, causing any fabrication processes specified by the recipe to be cancelled, i.e., not performed (55).

Where the input parameters in the recipe are proper according to the range specification, control server 20 approves the track-in operation, i.e., the selection of the semiconductor processing apparatus 10 (56). Then, the selected semiconductor processing apparatus 10 starts performing any fabrication process(es) specified by the recipe (57).

Unfortunately, the conventional control system for a semiconductor processing apparatus and its associated methods have at least the following drawbacks. First, control server 20 only verifies whether or not the input parameter values are between upper and lower limits. Accordingly, control server 20 fails to consider undesirable variations of the input parameter values or undesirable combinations of input parameter values, as examples. This can cause a number of problems. For instance, although the input parameter values may remain within the upper and lower limits, excessive variations of the input parameter values may cause unexpected failures during fabrication processes. Conventional control server 20 fails to address such variations of the input parameter values during fabrication processes.

Second, conventional control server 20 is typically limited in both data memory capacity and data processing capacity. As a result, where a large amount of data needs to be processed within a limited amount of time, control server 20 may fail to meet processing deadlines. For example, control server 20 may fail to verify a large number of input parameter values within a short period of time. Accordingly, control server 20 may fail to detect certain improper parameter values. In such cases, control server 20 may be configured only to verify a certain subset of the input parameter values of semiconductor processing apparatuses 10. Alternatively, the total number of input parameter values to semiconductor processing apparatuses 10 may simply be limited.

Third, modifying the range specification in the control program generally requires modifying the control program itself.

Fourth, due to the limited data memory in control server 20, it may be difficult to organize the input parameter values sent to control server 20 into a database format.

Fifth, where a particular recipe not registered with the control program is received by control server 20, the conventional control system has no way to verify the input parameter values in the non-registered recipe. Such a non-registered recipe may be a completely new recipe or an earlier used recipe.

Due to at least these shortcomings of the conventional control system for a semiconductor processing apparatus and its associated methods, an improved control system and new methods are needed.

SUMMARY OF THE INVENTION

Recognizing the need for improved ways of controlling semiconductor processing equipment, the present invention provides an automated system adapted to control a semiconductor processing apparatus.

According to one embodiment of the invention, a system for controlling a semiconductor processing apparatus comprises a control server connected to the semiconductor processing apparatus through a first communication interface, an operator interface connected to the control server through a second communication interface, a verification server connected to the control server through a third communication interface, and a database connected to the verification server through a fourth communication interface.

The database stores recipes available for the semiconductor processing apparatus and verification data comprising a range specification for input parameter values included in the input recipe.

The verification server comprises a range specification verification unit determining whether or not the input parameter values are within allowable ranges according to the range specification.

BRIEF DESCRIPTION OF THE DRAWINGS

The invention is described below in relation to several embodiments illustrated in the accompanying drawings. Throughout the drawings like reference numbers indicate like exemplary elements, components, or steps. In the drawings.

DESCRIPTION OF THE EXEMPLARY EMBODIMENTS

Exemplary embodiments of the invention are described below with reference to the corresponding drawings. These embodiments are presented as teaching examples. The actual scope of the invention is defined by the claims that follow.

Figure 3:
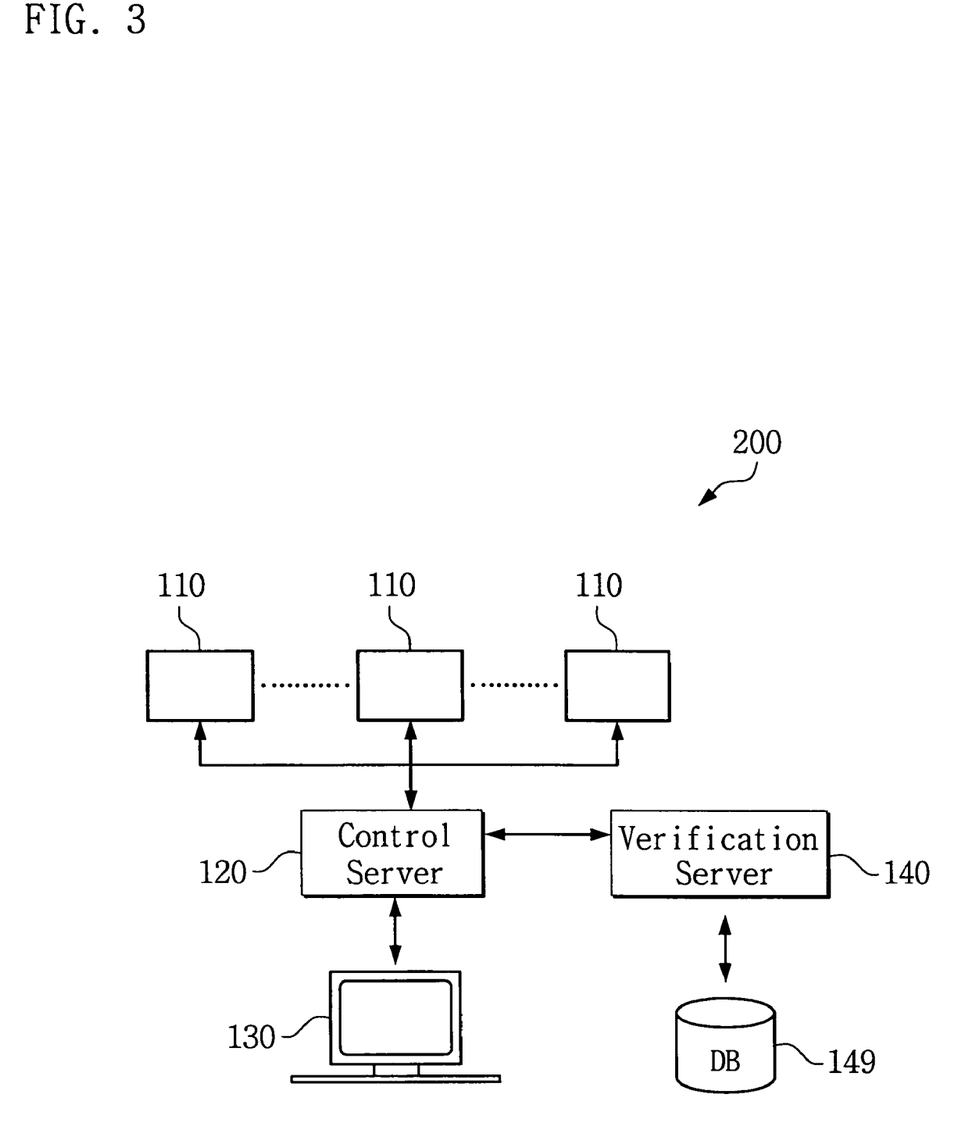
FIG. 3 is a block diagram of a control system for a semiconductor processing apparatus in accordance with an embodiment of the present invention.
Figure 4:
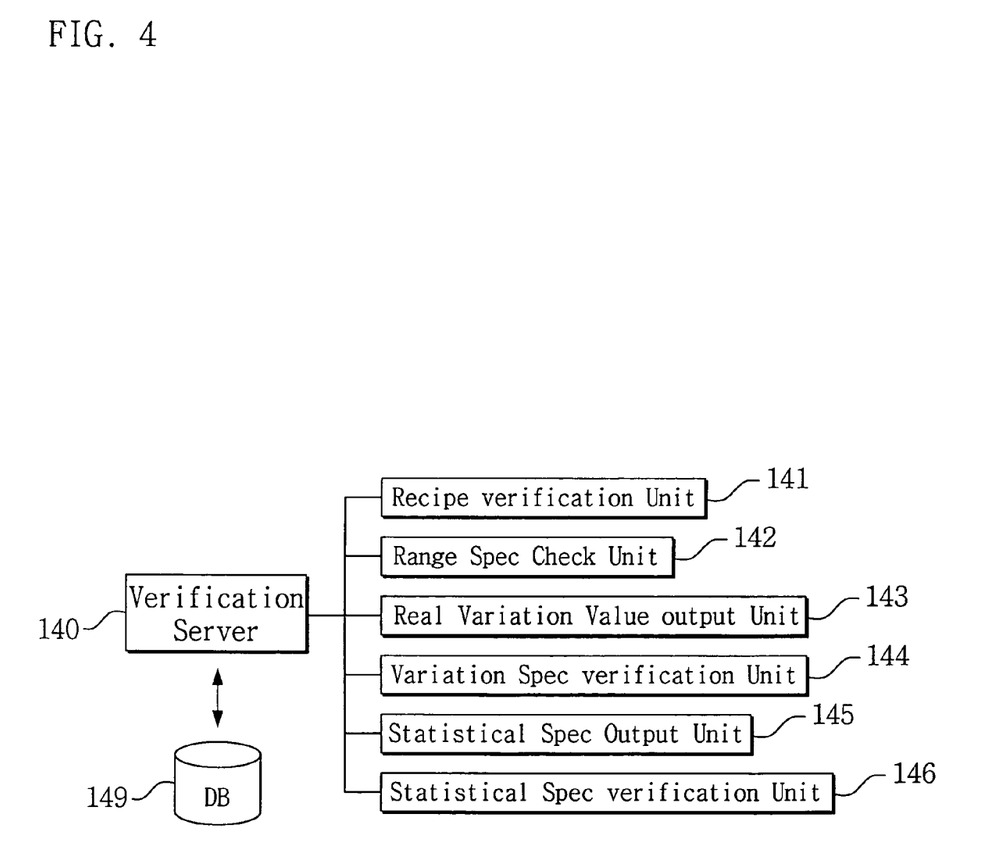
FIG. 4 is a block diagram of a verification server in the control system shown in FIG. 3; and, FIG. 5 is a flowchart illustrating a method of controlling a semiconductor processing apparatus using the control system shown in FIG. 3.

FIG. 3 is a block diagram of a control system 200 for a semiconductor processing apparatus in accordance with an embodiment of the present invention. FIG. 4 is a block diagram of a verification server 140 in control system 200 in accordance with an embodiment of the invention.

Referring to FIGS. 3 and 4, control system 200 comprises a control server 120, an operator interface 130, a verification server 140, and a database 149. A plurality of semiconductor processing apparatuses 110 arranged in semiconductor fabrication lines are connected to control server 120 through a communication interface. Operator interface 130 and verification server 140 are also connected to control server 120 through respective communication interfaces.

Each of semiconductor processing apparatuses 110 stores a recipe(s) (i.e., processes and associated input parameter values) related to semiconductor fabrication processes that can be performed by the unit. Each semiconductor processing apparatus 110 comprises software adapted to receive and store input parameter values for new and existing recipes.

Control server 120 comprises software adapted to control semiconductor processing apparatuses 110. Control server 120 controls semiconductor processing apparatuses 110 in response to a track-in operation performed via operator interface 130. In the track-in operation, one of the semiconductor processing apparatuses 110 is selected. Typically, the selection is made by a human operator. However, it could be made by an automatic procedure such as a computer program.

After the track-in operation is performed, control server 120 sends a request for a recipe to the selected semiconductor processing apparatus 110. The selected semiconductor processing apparatus 110 then sends a recipe to control server 120 and control server 120 sends the recipe to verification server 140. The recipe sent to control server 120 by the selected semiconductor processing apparatus 110 will be referred to hereafter as "the input recipe".

Verification server 140 performs an analysis of the input recipe to verify that the input recipe contains proper input parameter values. The verification server 140 includes a recipe verification unit 141, a range specification verification unit 142, a real variation value output unit 143, a variation specification verification unit 144, a statistical specification output unit 145, and a statistical specification verification unit 146.

Verification server 140 determines whether or not the input parameter values included in the input recipe are proper according to verification data stored in database 149. Where the input parameter values are determined to be improper, verification server 140 does not perform fabrication process(es) indicated by the input recipe. In addition, verification server 140 stores the input parameter values in database 149.

In control system 200, the input parameter values are verified by a separate verification server 140. This reduces the computational demands placed on control server 120. In addition, since the input parameter values are stored in database 149, verification server 140 can perform verification of the input parameter values by referring to database 149.

Database 149 not only stores the input parameter values for the input recipe. It also stores a variety of other recipes available for the respective semiconductor processing apparatuses 110. In addition, database 149 stores verification data used to verify the allowability of the input parameter values in the input recipe. The verification data includes, for example, a range specification, a variation specification, and a statistical specification, which are related to the recipes.

Recipe verification unit 141 verifies whether the input recipe is a new recipe or an earlier used recipe. Recipe verification unit 141 typically comprises a first recipe verification unit checking whether the input recipe is contained in database 149 and a second recipe verification unit verifying whether the input recipe has been used within a specific period of time.

Range specification verification unit 142 checks whether or not the input parameter values in the input recipe are within allowable ranges specified by the range specification.

Real variation value output unit 143 produces real variation values based on the input parameter values. Each real variation value specifies a difference between a current input parameter value contained in the input recipe and a corresponding previous input parameter value.

Variation specification verification unit 144 checks whether the real variation values are within allowable levels specified by the variation specification stored in database 149.

The input parameter values in the input recipe tend to vary depending on the number of times a particular fabrication process has been performed. As the fabrication process is repeated, the previously used input parameter values are stored in order. The real variation values corresponding to the previously used input parameter values are produced on the basis of current input parameter values. Then the real variation values are compared with the variation specification to determine whether they are within allowable ranges. It is therefore possible to determine whether or not the variation of the input parameter values is proper.

The following Table 1 shows an example of verification data related to a particular recipe "A". Table 2 shows an example of variations occurring in the input parameter values where a fabrication process has been executed four times and then the fifth track-in operation is performed. Table 3 shows real variation values for the examples shown in Tables 1 and 2. In Tables 1 through 3, R1, R2, R3 and R4 denote four recipes used in previous operations.

TABLE 1

Verification Data

| Recipe | Item | Range Specification | | Variation Specification | | |
|---|---|---|---|---|---|---|
| | | Lower Limit | Upper Limit | R1 | R2 | R4 |
| A | Time | 25 min | 35 min | ±1 min | ±2 min | ±2.5 min |

TABLE 2

Variations of Input Parameters

| Input Parameter | R4 | R3 | R2 | R1 | Track-In |
|---|---|---|---|---|---|
| Time | 30 min | 29 min | 29 min | 28 min | 27 min |

TABLE 3

Real Variation Value

| | Variation Specification | Real Variation Value | Verification Result |
|---|---|---|---|
| R1 | ±1 min | 1 min | OK |
| R2 | ±2 min | 2 min | OK |
| R4 | ±2.5 min | 3 min | Not OK |

Referring to Tables 1 and 2, the value of a "Time" input parameter provided in an input recipe for a current track-in operation is "27 min". This value falls within the respective upper and lower limits "35 min" and "25 min" in the range specification.

However, as shown in Table 3, the real variation values based on the current "Time" input parameter value are not within allowable ranges specified by the variation specification. In particular, the real variation values corresponding to recipes R1 and R2 are within allowable ranges, but the real variation value corresponding to recipe R4 is not within its allowable range. The real variation value corresponding to input recipe R4 is "3 min" while the allowable range is between plus and minus "2.5 min". Because the "Time" input parameter value produced by the current track-in operation is not within the allowable range according to the variation specification, current track-in operation is disapproved.

Statistical specification output unit 145 produces the statistical specification stored in database 149. The statistical specification contains statistical information derived from accumulated input parameter values. Statistical specification verification unit 146 receives the statistical specification from statistical specification output unit 145 and then determines whether or not the input parameter values are proper according to the criteria established relative to the statistical specification.

Where database 149 stores a large amount of verification data related to accumulated input parameter values, the statistical specification may be used in place of the range specification. As input parameter values accumulate over time, the statistical specification can be changed incrementally in accordance with the accumulated values.

As discussed previously, verification server 140 performs multilateral verification on the input recipe. Where the input recipe fails to satisfy a set of predetermined criteria related to the verification data, verification server 140 disapproves a track-in operation and generates interlock signals causing any fabrication processes specified by the input recipe to be cancelled. Where the input recipe satisfies all the predetermined criteria related to the verification data, verification server 140 approves the track-in operation, causing fabrication processes to begin in the semiconductor processing apparatus selected by the track-in operation.

Verification server 140 may also be configured to perform sequential verification on the input parameter values. Where verification server 140 performs sequential verification, a preferred order for performing the verification is as follows.

First, verification is performed by recipe check unit 141. Then verification is performed by range specification verification unit 142, followed by variation specification verification unit 144, and finally, statistical specification verification unit 146. Although the above order is a preferred order, other orderings are possible as well.

Figure 5:
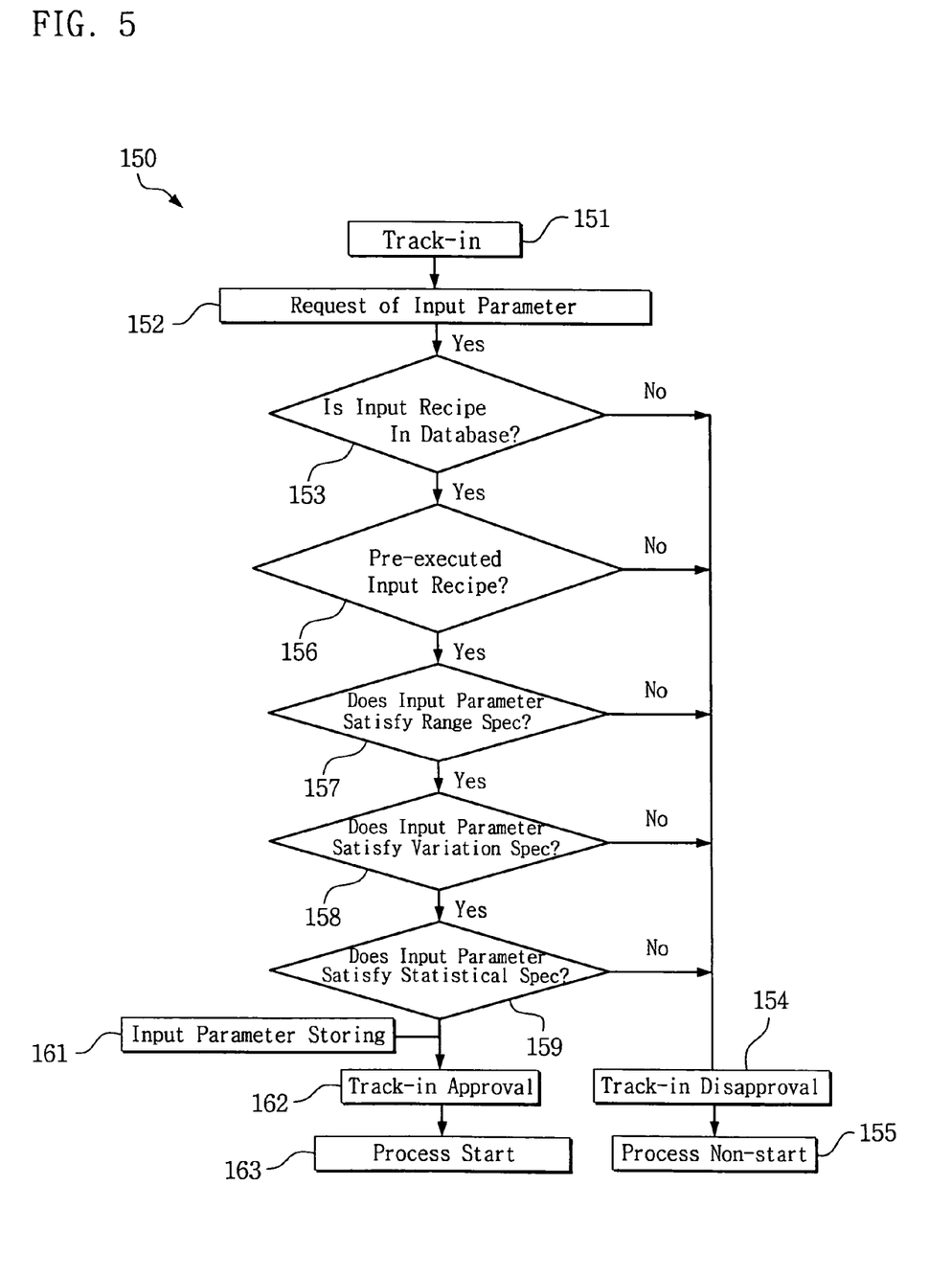

FIG. 5 is a flowchart illustrating a method 150 of controlling a semiconductor processing apparatus using control system 200 shown in FIG. 3.

Referring to FIGS. 3 through 5, a track-in operation is performed to select one of semiconductor processing apparatuses 110 through control server 120 via operator interface 130 (151).

Then, control server 120 requests that the selected semiconductor processing apparatus 110 send an input recipe including input parameter values currently set for the selected semiconductor processing apparatus (152). After receiving the input recipe, control server 120 sends the input recipe to verification server 140.

Verification server 140 sequentially performs a plurality of verification operations on the input recipe (153, 156, 157, 158, 159). Each verification operation serves to determine whether the input parameter values within the input recipe satisfy certain verification criteria relative to a set of verification data.

Where one of the verification operations determines that the input parameter values do not satisfy a particular verification criteria relative to the verification data, verification server 140 disapproves the track-in operation (154). Verification server 140 then sends signals to operator interface 130 indicating the disapproval of the track-in operation and also generates interlock signals communicating to the selected semiconductor processing apparatus not to perform the fabrication process included in the input recipe (155).

Where the input recipe satisfies all verification criteria relative to the verification data, verification server 140 approves the track-in operation (162). Verification server then sends signals to operator interface 130 indicating the approval of the track-in operation and fabrication processes indicated in the input recipe are then performed by the selected semiconductor processing apparatus 110 (163).

The plurality of verification operations performed on the input recipe are as follows. First, recipe verification unit 141 determines whether or not the input recipe is contained in database 149 or is a new recipe (153). Where the input recipe is contained in database 149, recipe verification unit 141 determines whether or not the input recipe has been executed within a specific period of time (156). Where the input recipe has been not executed within a specific period of time, recipe verification unit 141 disapproves the track-in operation (154).

Upon determining that the input recipe has been executed within a specific period of time, range specification verification unit 142 determines whether or not the input parameter values in the input recipe are within an allowable range specified by the range specification (157).

Upon determining that the input parameter values in the input recipe are within the allowable range, variation specification verification unit 144 computes real variation values from the input parameter values and determines whether the real variation values are within an allowable variation range according to the variation specification (158).

Upon determining that the real variation values are within the allowable variation range, statistical specification verification unit 146 determines whether or not the input parameter values satisfy certain criteria related to the statistical specification (159).

Upon determining that the input parameter values satisfy the criteria related to the statistical specification, the input parameter values in the input recipe are stored in database 149 (161). In addition, the track-in operation is approved (162), and then fabrication process(es) included in the input recipe are started in the selected semiconductor processing apparatus (163).

As discussed above, input parameter values are evaluated by a separate verification server to determine whether or not they satisfy certain criteria related to a set of verification data. This relieves part of a computational load from a control server.

Furthermore, verification data related to the parameter values is stored in a database, allowing a verification server in the control system to perform various verification operations on the input parameter values by accessing the database. For example, the verification server may access the database to determine whether the input recipe is a new recipe or a previously executed recipe. Accordingly, process failures are prevented from occurring due to non-registered input recipes.

Moreover, the verification server determines whether or not the input parameter values satisfy criteria related to a range specification, a variation specification and a statistical specification. Accordingly, the control system of the present invention prevents process failures from occurring due to improper choices of input parameter values.

Finally, the verification server is capable of producing and utilizing the statistical specification in place of the range specification. In other words, after a significant amount of statistical information has been collected in the statistical specification, the statistical specification can be used to specify upper and lower allowable limits for the input parameter values.

The foregoing preferred embodiments are teaching examples. Those of ordinary skill in the art will understand that various changes in form and details may be made to the exemplary embodiments without departing from the scope of the present invention which is defined by the following claims.

What is claimed is:

1. A system for controlling a semiconductor processing apparatus having an input recipe stored therein, the control system comprising:
    a control server connected to the semiconductor processing apparatus through a first communication interface;
    an operator interface connected to the control server through a second communication interface;
    a verification server separate from the control server connected to the control server through a third communication interface, the verification server comprising a range specification verification unit; and,
    a database connected to the verification server through a fourth communication interface, the database storing recipes available for the semiconductor processing apparatus and verification data comprising a range specification for input parameter values included in the input recipe;
    wherein the range specification verification unit determines whether or not the input parameter values associated with the input recipe are within allowable ranges according to the range specification, and the verification server communicates to the operator interface, in accordance with the determination of the range specification verification unit, information controlling whether or not a fabrication process indicated by the input recipe will be performed.

2. The control system of claim 1, wherein the verification data further comprises a variation specification.

3. The control system of claim 1, wherein the verification data further comprises a statistical specification.

4. The control system of claim 1, wherein the verification server further comprises a recipe verification unit determining whether or not the input recipe is contained in the database.

5. The control system of claim 4, wherein the recipe verification unit determines whether or not the input recipe has been used within a specific period of time.

6. The control system of claim 2, wherein the verification server further comprises:
   a real variation value output unit producing real variation values indicating differences between the input parameter values and parameter values used by the semiconductor processing apparatus in a previously performed process; and,
   a variation specification verification unit determining whether or not the real variation values are within allowable levels specified by the variation specification.

7. The control system of claim 3, wherein the verification server further comprises:
   a statistical specification output unit producing the statistical specification; and,
   a statistical specification verification unit determining whether or not the input parameter values are allowable according to the statistical specification.

8. The control system of claim 1, wherein the first through fourth communication interfaces comprise network lines.

9. The control system of claim 1, wherein the semiconductor processing apparatus is selected from a plurality of semiconductor processing apparatuses connected to the control server through the first communication interface.

10. The control system of claim 6, wherein the parameter values used by the semiconductor processing apparatus in a previously performed process are stored in the database.

11. The control system of claim 1, wherein a statistical specification containing statistical information derived from accumulated input parameter values is used as the range specification.

12. A system for controlling a semiconductor processing apparatus having an input recipe stored therein, the control system comprising:
   a control server connected to the semiconductor processing apparatus through a first communication interface;
   a verification server separate from the control server and connected to the control server through a second communication interface, the verification server comprising a range specification verification unit; and,
   a database connected to the verification server through a third communication interface, the database storing recipes available for the semiconductor processing apparatus and verification data comprising a range specification for input parameter values included in the input recipe;
   wherein the range specification verification unit determines whether or not the input parameter values are within allowable ranges according to the range specification, and the verification server generates information controlling the performance of a fabrication process indicated by the input recipe in accordance with the determination of the range specification verification unit.

13. The control system of claim 12, wherein the verification data further comprises a variation specification.

14. The control system of claim 12, wherein the verification data further comprises a statistical specification.

15. The control system of claim 12, wherein the verification server further comprises a recipe verification unit determining whether or not the input recipe is contained in the database.

16. The control system of claim 15, wherein the recipe verification unit determines whether or not the input recipe has been used within a specific period of time.

17. The control system of claim 13, wherein the verification server further comprises:
   a real variation value output unit producing real variation values indicating differences between the input parameter values and parameter values used by the semiconductor processing apparatus in a previously performed process; and,
   a variation specification verification unit determining whether or not the real variation values are within allowable levels specified by the variation specification.

18. The control system of claim 14, wherein the verification server further comprises:
   a statistical specification output unit producing the statistical specification; and,
   a statistical specification verification unit determining whether or not the input parameter values are allowable according to the statistical specification.

19. The control system of claim 12, wherein the first through third communication interfaces comprise network lines.

20. The control system of claim 12, wherein the semiconductor processing apparatus is selected from a plurality of semiconductor processing apparatuses connected to the control server through the first communication interface.

* * * * *